(12) United States Patent
Root et al.

(10) Patent No.: US 8,578,124 B2
(45) Date of Patent: Nov. 5, 2013

(54) STORAGE SYSTEMS AND METHODS WITH PRE-RESERVE ALLOCATION

(75) Inventors: Michael E. Root, San Jose, CA (US); Charles Silvers, Santa Clara, CA (US)

(73) Assignee: Symantec Corporation, Mountain View, CA (US)

( * ) Notice: Subject to any disclaimer, the term of this patent is extended or adjusted under 35 U.S.C. 154(b) by 554 days.

(21) Appl. No.: 12/641,999

(22) Filed: Dec. 18, 2009

(65) Prior Publication Data

US 2011/0153977 A1   Jun. 23, 2011

(51) Int. Cl.
*G06F 12/00* (2006.01)
(52) U.S. Cl.
USPC ............ 711/171; 711/170; 711/E12.001; 711/E12.002
(58) Field of Classification Search
USPC ............ 711/170, 171, E12.001, E12.002
See application file for complete search history.

(56) References Cited

U.S. PATENT DOCUMENTS

| 7,487,322 | B2* | 2/2009 | Cannon et al. | 711/170 |
| 7,600,083 | B2* | 10/2009 | Aggarwal et al. | 711/154 |
| 2008/0256314 | A1* | 10/2008 | Anand et al. | 711/162 |

\* cited by examiner

*Primary Examiner* — Jasmine Song
(74) *Attorney, Agent, or Firm* — Wilmer Cutler Pickering Hale and Dorr LLP

(57) ABSTRACT

Systems and methods for information storage replication are presented. In one embodiment a storage flow control method includes receiving a memory operation indication; performing a pre-reserve allocation process before proceeding with the memory operation, wherein the pre-reserve allocation process includes converting available unallocated memory space to allocated memory space if there is sufficient available unallocated memory space to perform the memory operation; executing the memory operation if the pre-reserve allocation process returns an indication there is sufficient memory space allocated to perform the memory operation; and aborting the memory operation if the pre-reserve allocation process returns an indication there is sufficient memory space allocated to perform the memory operation. In one embodiment, the memory operation is a write operation. The memory operation can be a write operation.

20 Claims, 8 Drawing Sheets

700

701
Receiving a memory operation indication.

702
Performing a pre-reserve allocation process before proceeding with a memory operation; wherein the pre-reserve allocation process includes converting available unallocated memory space to allocated memory space if there is sufficient available unallocated memory space to perform the memory operation.

703
Executing the memory operation if the pre-reserve allocation process returns an indication there is sufficient allocated memory space to perform the memory operation.

704
Aborting the memory operation if the pre-reserve allocation process returns an indication there is in sufficient allocated memory space to perform the memory operation.

910
Processing Component

Computer Readable Medium 920

Memory Operation Module 930

940
Memory operation receipt module.

950
A pre-reserve allocation process module.

951
Allocation determination module.

952
Pre-reserve allocation command issue module.

953
Successful memory operation response pausing module.

954
Write continuation indication module.

970
Memory operation execution module.

FIG 6 ized systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. Accurately writing the information to a storage location is often very important for a variety or reasons.

STORAGE SYSTEMS AND METHODS WITH PRE-RESERVE ALLOCATION

FIELD OF THE INVENTION

The present embodiments relate to the field of information storage replication.

BACKGROUND OF THE INVENTION

Electronic systems and circuits are often utilized in a number of applications to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. Accurately writing the information to a storage location is often very important for a variety or reasons.

Traditional file system architectures typically issue a write operation command assuming there is physical storage for the write. However, many architectures do not necessarily maintain and allocate massive amounts of physical memory that an application could potentially use. For example, there are a variety of architectures (e.g., system memory, thin provisioned architectures, etc.) in which an application operates utilizing a very large virtual memory space that may not be correspondingly manifested in its entirety in a physical memory space. In some traditional architectures, file systems are not aware of a reduced physical memory space. For example, file systems do not typically know a physical memory is associated with a thin Logical Unit Number (LUN) or a LUN with a reported size that is larger than the physical space available and the fact that the thin LUN can be over provisioned. Conventional approaches typically cache a write and return a successful write indication to an application before sending the write to a LUN or completing the write in allocated physical memory. However, if there is not enough physical memory allocated to sufficiently handle or store information associated with a write operation, the write will fail. If a write fails after a successful indication has been returned to an application, then the file system is in an inconsistent state and drastic measures typically need to be taken to correct the problem.

SUMMARY

Systems and methods for information storage replication are presented. In one embodiment a storage flow control method includes receiving a memory operation indication; performing a pre-reserve allocation process before proceeding with the memory operation, wherein the pre-reserve allocation process includes converting available unallocated memory space to allocated memory space if there is sufficient available unallocated memory space to perform the memory operation; executing the memory operation if the pre-reserve allocation process returns an indication there is sufficient memory space allocated to perform the memory operation; and aborting the memory operation if the pre-reserve allocation process returns an indication there is sufficient memory space allocated to perform the memory operation. In one embodiment, the memory operation is a write operation.

In one exemplary implementation, the pre-reserve allocation process includes: pausing a successful memory operation response until pre-reserve allocation operations are complete; determining if there is enough allocated memory space to perform the memory operation; determining if there is enough unallocated physical memory space available for conversion to allocated memory space; converting unallocated memory space to allocated memory space if there is enough physical memory space available to perform the memory operation and not enough allocated memory space to perform the memory operation; forwarding a sufficient allocated memory space indication if the pre-reserve allocation operation is able to establish sufficient allocated memory space; and forwarding an insufficient memory space indication if the pre-reserve allocation operation is not able to establish sufficient allocated memory space. The pre-reserve allocation process can allocate memory space on an as needed basis and the pre-reserve allocation process can allocate sufficient memory space to handle a future memory operation. In one embodiment, the memory operation is a two phase confirm memory operation. In one exemplary implementation, corrective measures are performed if the pre-reserve allocation process returns an out of physical memory indication.

In one embodiment a computer readable storage medium having stored thereon, computer-executable instructions that when executed by a computing device cause the computing device to perform a method comprising: receiving a memory operation indication; performing a pre-reserve allocation process before proceeding with the memory operation, wherein the pre-reserve allocation process includes converting available unallocated memory space to allocated memory space if there is sufficient available unallocated memory space to perform the memory operation; executing the memory operation if the pre-reserve allocation process returns an indication there is sufficient memory space allocated to perform the memory operation; and aborting the memory operation if the pre-reserve allocation process returns an indication there is not sufficient memory space allocated to perform the memory operation. In one exemplary implementation a system, comprises a computer system having a processor coupled to a computer readable storage media and executing computer readable code which causes the computer system to perform a method of: receiving a memory operation indication; performing a pre-reserve allocation process before proceeding with the memory operation, wherein the pre-reserve allocation process includes converting available unallocated memory space to allocated memory space if there is sufficient available unallocated memory space to perform the memory operation; executing the memory operation if the pre-reserve allocation process returns an indication there is sufficient memory space allocated to perform the memory operation; and aborting the memory operation if the pre-reserve allocation process returns an indication there is sufficient memory space allocated to perform the memory operation.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

FIG. 4 is flow chart of an exemplary memory operation method in accordance with one embodiment of the present invention.

FIG. 6 is a block diagram of an exemplary system in accordance with one embodiment of the present invention.

DETAILED DESCRIPTION

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, it will be obvious to one ordinarily skilled in the art that the present invention may be practiced without these specific details. In other instances, well known methods, procedures, components, and circuits have not been described in detail as not to unnecessarily obscure aspects of the current invention.

The present systems and methods facilitate efficient and effective memory storage operations. Storage systems and methods minimize resource occupation and time expenditure on failures associated with insufficient memory allocation. A pre-reserve allocation operation converts available unallocated physical memory into preallocated physical memory before a memory operation (e.g., write operation, directory creation, etc.) encounters a difficulty in attempting to utilize otherwise unallocated memory space. In one embodiment, a successful memory operation indication response is paused until the space allocation is confirmed. In one exemplary implementation, once memory allocation is confirmed the successful indication response is forwarded to the requester. The pre-reserve allocation operation can also facilitate a graceful failure if no physical storage is available. In one embodiment, a SCSI command is utilized in the file system to preallocate physical storage in a thin LUN.

It is appreciated that a pre-reserve allocation operation can be utilized for a variety memory operations. In one embodiment, the pre-reserve allocation operation can be utilized to facilitate allocation of sufficient memory space for information associated with an application data write. In one exemplary implementation, the information can include application data and metadata (e.g., information associated creating and maintaining a directory, filename, etc.).

Figure 1:
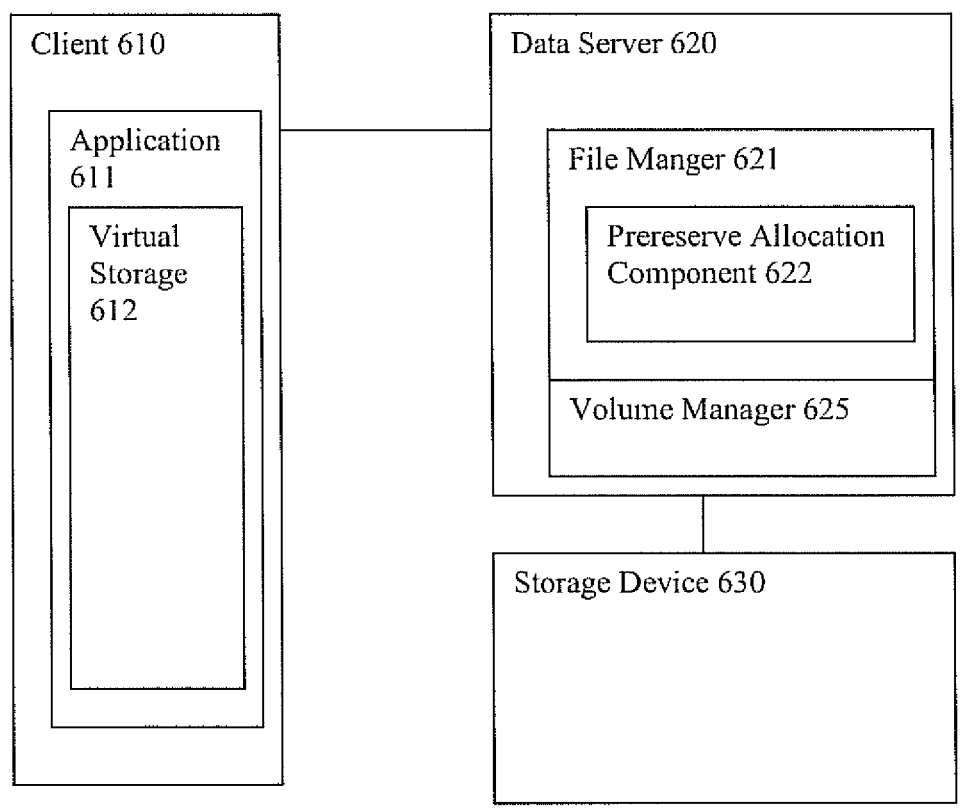
FIG. 1 is a block diagram of an exemplary system in accordance with one embodiment of the present invention.

FIG. 1 is a block diagram of system 600 in accordance with one embodiment of the present invention. System 600 includes a client 610, data server 620 and storage device 630. Client 610 is communicatively coupled to data server 620 which in turn is communicatively coupled to storage device 630. Client 610 includes application 611 and virtual storage 612. Application 611 directs performance of various operations and indicates storage of information associated with the application 611 in accordance with virtual memory 612. Data server 620 includes a file system manager 621 and a volume manager 625. File system manager 621 directs management of the files system and volume manager 625 directs volume management. File system manager 621 includes a pre-reserve allocation component 622. Pre-reserve allocation component 622 directs investigation of memory space allocation status in response to a memory operation indication (e.g., write command, etc.) from client 610 and conversion of unallocated to allocated physical memory space as needed and if available.

In one embodiment, pre-reserve allocation component 622 issues a pre-reserve allocation command to ensure there is enough physical memory space allocated to perform the write operation before a memory operation proceeds. If the response to the pre-reserve allocation command indicates that there is not enough physical space available for allocation, the pre-reserve operation notifies the file system that additional memory space could not be allocated. The file system can then abort the memory operation. This facilitates minimization of file system operations that might otherwise occur, making recovery difficult. For example, in a two-phase commit memory operation, in which a first phase includes storing information regarding the intent of the memory operation, the present approach facilitates aborting the memory operation before storage of information in the first phase that would otherwise be difficult to unwind or correct if an abort was not initiated until the second phase.

In one embodiment, a memory operation request has multiple components that are not atomic. However, in proper operation if one can not be performed then none should be performed. In one exemplary implementation, an indication to store information in a new file is received and the operation involves multiple components. For example, a new file structure is initialized on disk, a directory entry is created to point to the new file, and the data associated with the new file is stored. If a pre-reserve allocation process can not secure sufficient allocated memory space for the directory entry the memory operation can not complete. Without the present pre-reserve allocation process returning an indication that sufficient memory space can not be allocated for the directory entry, the initialization of the file structure would proceed and be very difficult to correct if the memory allocation failure was not detected until after the write has begun.

Figure 2:
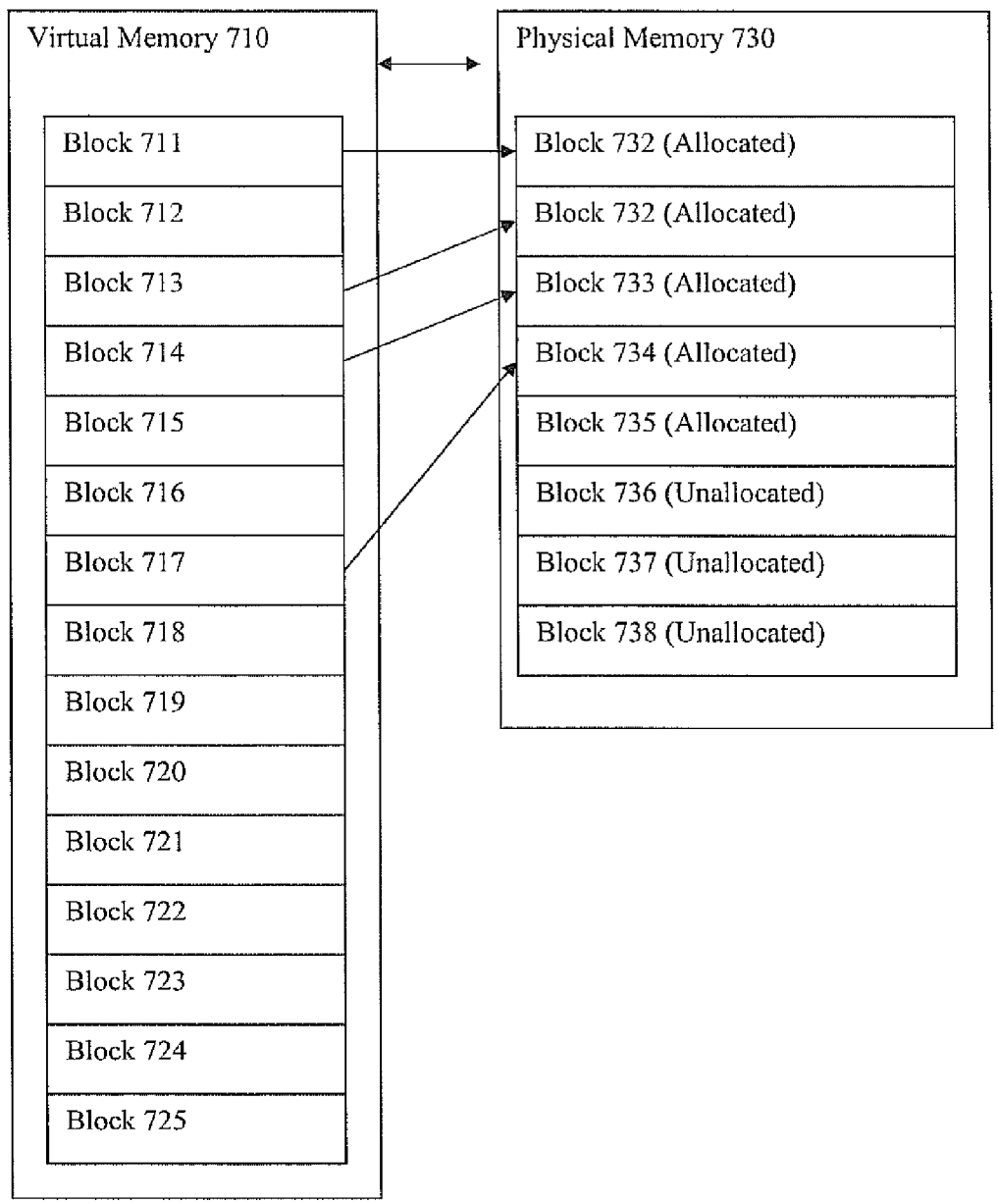
FIG. 2 is a block diagram of an exemplary memory configuration at a first time in accordance with one embodiment of the present invention.

FIG. 2 is a block diagram of exemplary memory configuration 100 in accordance with one embodiment of the present invention. Memory configuration 100 includes virtual memory 710 and physical memory 730. In one embodiment, virtual memory 710 is associated with an application and has virtual storage blocks 711 through 725. In one embodiment, physical memory 730 includes physical storage blocks 731 through 738. In one exemplary implementation, at a first time the information associated with virtual memory blocks 711, 713, 714, and 717 is written to allocated physical memory blocks 731 through 735 respectively.

Figure 3:
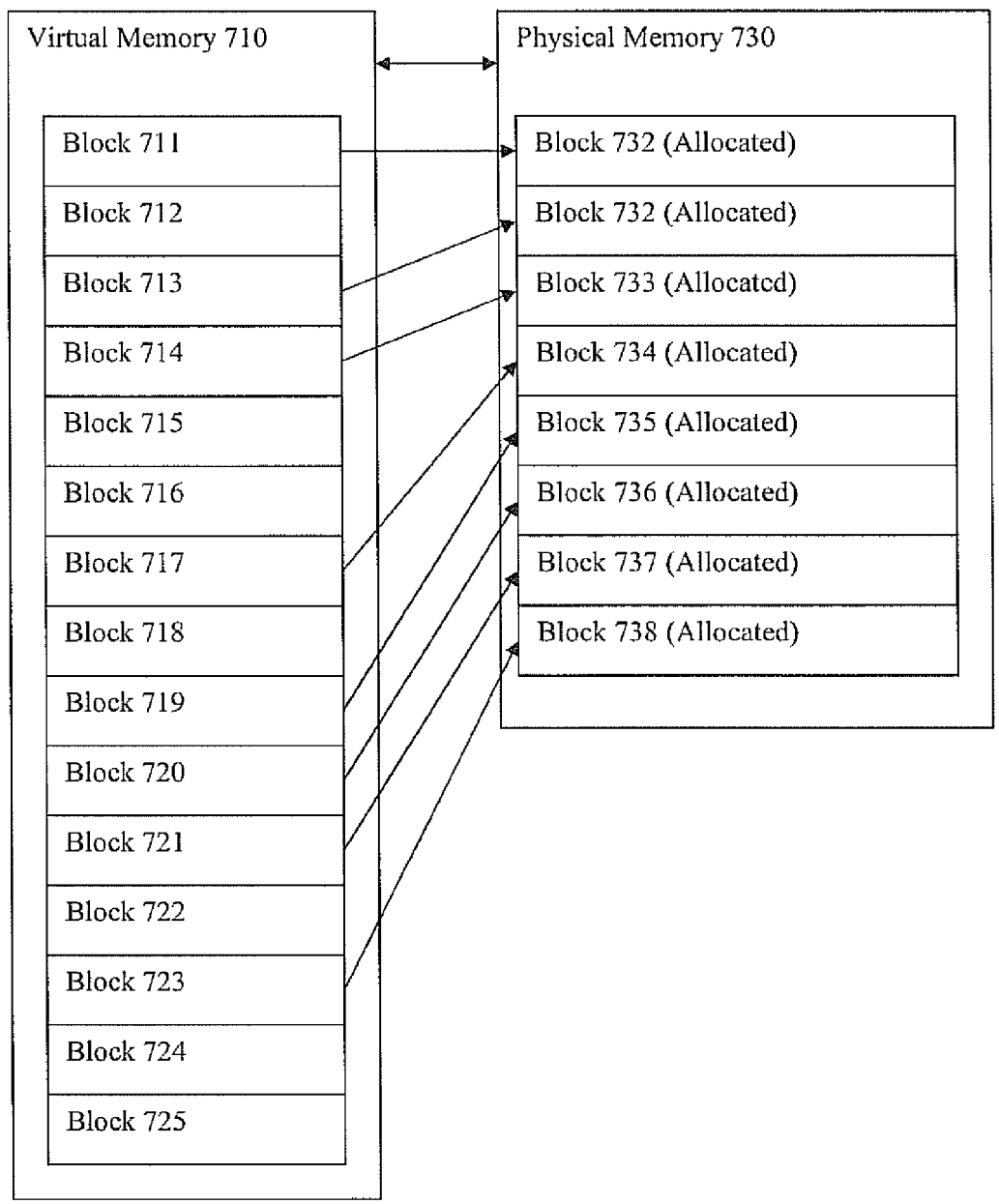
FIG. 3 is a block diagram of exemplary memory configuration at a second time in accordance with one embodiment of the present invention.

FIG. 3 is a block diagram of exemplary memory configuration 100 at a second time after a write command is received directing information in virtual blocks 719, 720, 721 and 723 to be written to physical memory 730. When the write command is received, a pre-reserve operation directs conversion of previously unallocated blocks 736, 737 and 738 to an allocated state and informs a file system the write can continue. Once the confirmation of sufficient allocated memory space is received, the write operation proceeds to write information in virtual blocks 719, 720, 721 and 723 to physical memory blocks 735, 736 737 and 738 respectively.

If an additional write command is received after the time in FIG. 3 when a pre-reserve process attempts to ensure there is sufficient allocated memory space it will receive an indication there is insufficient memory space to complete the additional write. The pre-reserve process will forward an indication to the file system that there is insufficient memory space available and the file system can abort the write operations before initiating the first phase of a two phase confirm memory operation.

FIG. 4 is flow chart of an exemplary memory operation method 700 in accordance with one embodiment of the present invention. In one embodiment, memory operation method 700 minimizes failures associated with insufficient memory space allocation. A pre-reserve allocation operation converts available unallocated physical memory space into pre-allocated physical memory space before a write operation encounters a difficulty in attempting to write to otherwise unallocated memory space. In one embodiment a successful write indication response is not forwarded until sufficient storage space is successfully allocated. The exemplary memory operation method 700 can also facilitate a graceful failure if no physical storage is available. For example, a normal error can be returned (e.g., if there is no more physical memory associated with the LUN, etc.). In one exemplary implementation, a pre-reserve allocation operation that encounters an out of physical memory situation can essentially turn a physical error into a virtual out of space error which the systems can handle and resolve.

In block 701, a memory operation indication is received. In one embodiment the memory operation is a write operation.

In block 702, a pre-reserve allocation process is performed before proceeding with the memory operation. In one embodiment, pre-reserve allocation process converts available unallocated memory space to allocated memory space if there is sufficient available unallocated memory space to perform the memory operation. By converting unallocated memory space to allocated memory space the memory operation can proceed without an insufficient memory error due to physically available but unallocated memory space.

In one embodiment, corrective measures are performed if the pre-reserve allocation process returns an out of physical memory indication. In one embodiment, the file system fails writes that need space. The file system can convert a write to a synchronous write and only return success if the write to the LUN succeeds. Since the out of space condition could be temporary, the file system could also do other things like trigger a reclaim operation (e.g., converting used storage space to unused storage space, etc.) to get back more physical storage. In one embodiment, reclaiming may accomplish this task by: 1) identifying a volume striped across a set of storage devices, 2) identifying a reclamation request to reclaim storage space allocated to the striped volume, and, for at least one device in the set of storage devices (e.g., for each device in the set of storage devices): 3) identifying the stripes of storage on the device that are covered by the reclamation request, 4) creating a consolidated reclamation request for the device that identifies each stripe of storage on the device that is covered by the reclamation request, and then 5) issuing the consolidated reclamation request to the device. The reclaiming can be done without stopping complete access to the file system. Reads and writes that did not need more space would continue without interruption.

In block 703, the memory operation is executed if the pre-reserve allocation process returns an indication there is sufficient allocated memory space to perform the memory operation. In one embodiment, data associated with a write operation is forwarded to and stored in physical memory. The physical memory can have a variety of configurations. In one exemplary implementation the physical memory is associated with a thin provisioned LUN.

In block 704, the memory operation is aborted if the pre-reserve allocation process returns an indication there is insufficient allocated memory space to perform the memory operation.

In one embodiment, a file system keeps track of used and unused blocks. The file system moves block from the unused to the used state in relatively large chunks and uses the blocks until more are needed, at which time an additional relatively large chunk of blocks are moved from an unused to used state. In one exemplary implementation, the pre-reserve allocation command guarantees that there is physical storage for the relatively large chunk when it is moved from the unused to the used state. This facilitates avoidance of errors associated with a write to a "used" block that returns an out of physical space error.

Figure 5:
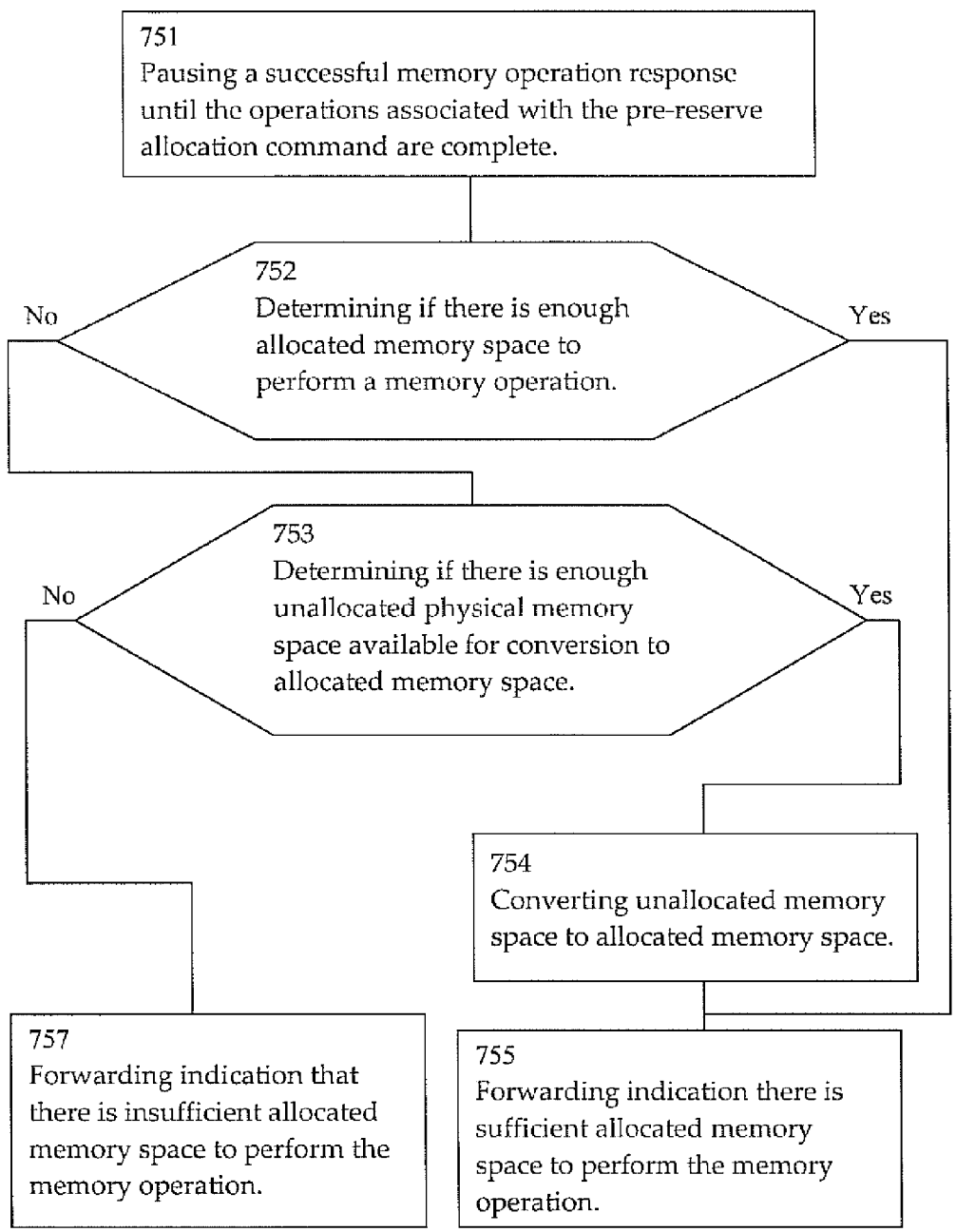
FIG. 5 is a block diagram of an exemplary pre-reserve allocation process in accordance with one embodiment of the present invention.

FIG. 5 is a block diagram of pre-reserve allocation process 750B in accordance with one embodiment of the present invention. In one embodiment, the pre-reserve allocation process is performed in a file system. In one exemplary implementation the pre-reserve allocation process allocates a number of blocks on an as needed basis. In one embodiment a pre-reserve allocation process can be initiated by a pre-reserve allocation command. It is appreciated the pre-reserve allocation command can have a variety of configurations. In one exemplary implementation, the pre-reserve allocation command is a SCSI command. A system can be configured to recognize a SCSI command that is otherwise used for other operations is re-designated or "converted" for use as a pre-reserve allocation command.

In block 751, a memory operation status indication is paused until pre-reserve allocation operations are complete. In one exemplary implementation, successful memory operation indications and memory error indications back to a file system or application are paused until the pre-reserve allocation process is finished.

In block 752, a determination is made whether there is enough allocated memory space to perform a memory operation. In one embodiment, a determination is made whether there is enough allocated memory space to perform the current memory operation. The determination can also be directed to a prediction of future memory operations. In one exemplary implementation, even if there is enough unused allocated memory space to perform the current memory operation, an allocation status determination can also look at how much unused allocated memory space is available and whether it is enough to handle the current memory operation and a future memory operation. For example, there may be 75K of unused allocated memory space and a current write operation may require 70K and while there is enough to handle the current write operation the allocation status determination can indicate there is not enough unused allocated memory space since the 5K left after the current memory operation is not likely to be enough for many future memory operations. If there is enough allocated memory space the process proceeds to block 755. If there is not enough allocated memory space the process proceeds to block 753.

In block 753, a determination is made whether there is enough physical unallocated memory space available for conversion to allocated memory space. In one embodiment, memory space previously used for another memory operation can be reclaimed. If there is not enough physical memory space available for conversion to allocated memory space the process proceeds block 756. If there is enough physical memory available for conversion the process proceeds to block 754.

In block 754, unallocated memory space is converted to allocated memory space. The amount of memory space allocated by the pre-reserve allocation process can vary. The amount of memory space allocated by can be enough to handle the current memory operation (e.g., write, etc.) or can be a prediction of an amount that is anticipated to be required to handle future memory operations. For example, a current write operation may require 70K and while directing allocation of 70K to handle the current write operation, the pre-reserve command may direct an allocation operation to allocate 250K so there is enough to handle a future memory operation.

In block 755, an indication there is sufficient allocated memory space to perform the memory operation is forwarded. In one embodiment, the process proceeds with block 703. In one embodiment, a successful memory write indication is forwarded to an application once the pre-reserve allocation of sufficient memory space is completed. In one exemplary implementation, the successful memory operation (e.g., write, etc.) is forwarded before the memory operation has completed the actual storage of the information in a physical memory storage location.

In block 757, an indication that there is insufficient physical memory space to perform the memory operation is forwarded to the file system. In one embodiment the file system can abort the memory operation.

It is appreciated that a pre-reserve allocation process can be accomplished by a variety of mechanisms. In one embodiment, a pre-reserve allocation command is issued to initiate conversion of a designated amount of unallocated memory space. In an alternate embodiment, a write operation with "dummy" information is performed. The "dummy" write operation essentially gets physical memory space allocated for the "dummy" information which is overwritten when the real data associated with the write eventually comes in from the client and is forwarded for storage in the physical memory. In one embodiment, a write_same operation is performed to "pre-reserved" allocated memory space. It is also appreciated that a pre-reserve allocation process can be utilized to ensure there is sufficient unused allocated space available for a variety of memory operations.

FIG. 6 is a block diagram of system 900 in accordance with one embodiment of the present invention. System 900 includes a processor 910 and computer readable medium 920. In one embodiment, the computer readable medium 920 is a memory. Depending on the configuration and type of computer system 900 that is used, the memory can be volatile (e.g., such as DRAM, etc.), non-volatile (e.g., such as ROM, flash memory, etc.) or some combination of the two. Similarly, the memory can comprise other devices including solid-state devices, such as, for example, magnetic disk-based media, optical media, or the like.

In one embodiment, computer readable medium 920 includes memory operation module 930 which includes instructions for directing processor 910 in performance of a memory operation method (e.g., memory operation method 700, etc.). Memory operation module 930 includes memory operation receipt module 940, pre-reserve allocation process module 950 and memory operation execution module 970. Memory operation receipt module 940 includes instructions for determining a memory operation indication (e.g., a write operation, etc.) is received. Pre-reserve allocation process module 950 includes instructions for ensuring there is enough physical memory allocated to perform a memory operation (e.g., write operation, etc.) before the memory operation receives an indication that there is not enough physical memory allocated. Memory operation execution module 970 includes instructions for execution of the memory operation (e.g., write operation, etc.).

In one embodiment, pre-reserve allocation process module 950 includes allocation determination module 951, pre-reserve allocation command module 952, successful memory operation response pausing module 953 and memory continuation indication module 954. Allocation determination module 951 includes instructions for determining if there is enough unused allocated memory to perform a memory operation. Pre-reserve allocation command module 952 includes instructions for issuing a pre-reserve allocation command to allocate physical space for the memory operation if there is not enough unused allocated memory to perform a memory operation. Successful memory operation response pausing module 953 includes instructions for pausing a successful memory operation response indication until the allocation operations associated with the pre-reserve allocation command are complete. The continuation indication module 954 indicates the write operation should continue.

Computer system 900 can be implemented as, for example, a server computer system, workstation computer system, desktop computer system, or laptop computer system. Similarly, computer system 900 can be implemented as a handheld device. Computer readable media can also be a number of different types of media that can be accessed by computer system and can include, but is not limited to, removable and non removable computer storage media, flash memory, hard disk, optical disk drive, compact disk (CD) etc.).

It should further be noted, that the computer system 900 can have some, most, or all of its functionality supplanted by a distributed computer system having a large number of dispersed computing nodes, as would be the case where the functionality of the computer system 900 is partly or wholly executed using a cloud computing environment.

Figure 7:
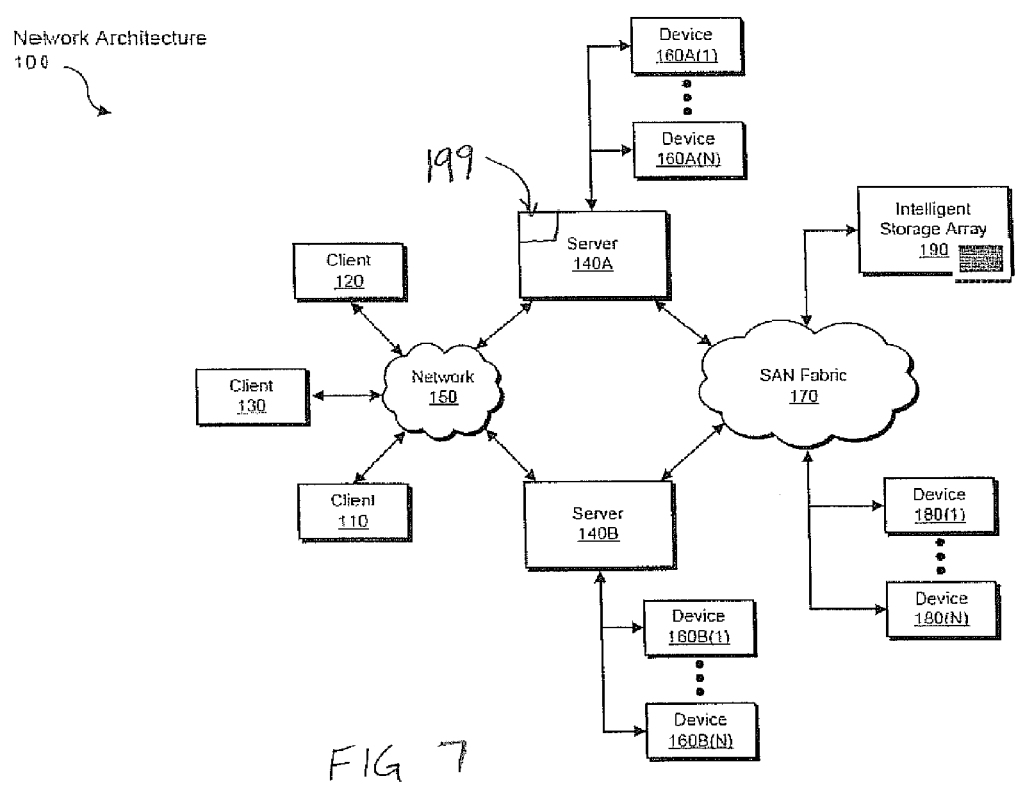
FIG. 7 is a block diagram depicting an exemplary network architecture in accordance with one embodiment of the present invention.

FIG. 7 is a block diagram depicting a network architecture 1000 in which client systems 110, 120 and 130, as well as storage servers 140A and 140B (any of which can be implemented using computer system 210), are coupled to a network 150. Storage server 140A is further depicted as having storage devices 160A (1)-(N) directly attached, and storage server 140B is depicted with storage devices 160B (1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. Intelligent storage array 190 is also shown as an example of a specific storage device accessible via SAN fabric 170. In one embodiment, server 140A includes storage memory operation module 199. In one embodiment, memory operation module 199 is similar to similar to memory operation module 930. It is appreciated that present systems and methods are compatible with a variety of implementations. For example, portions of information and instructions associated with can be distributed in various resources.

Figure 8:
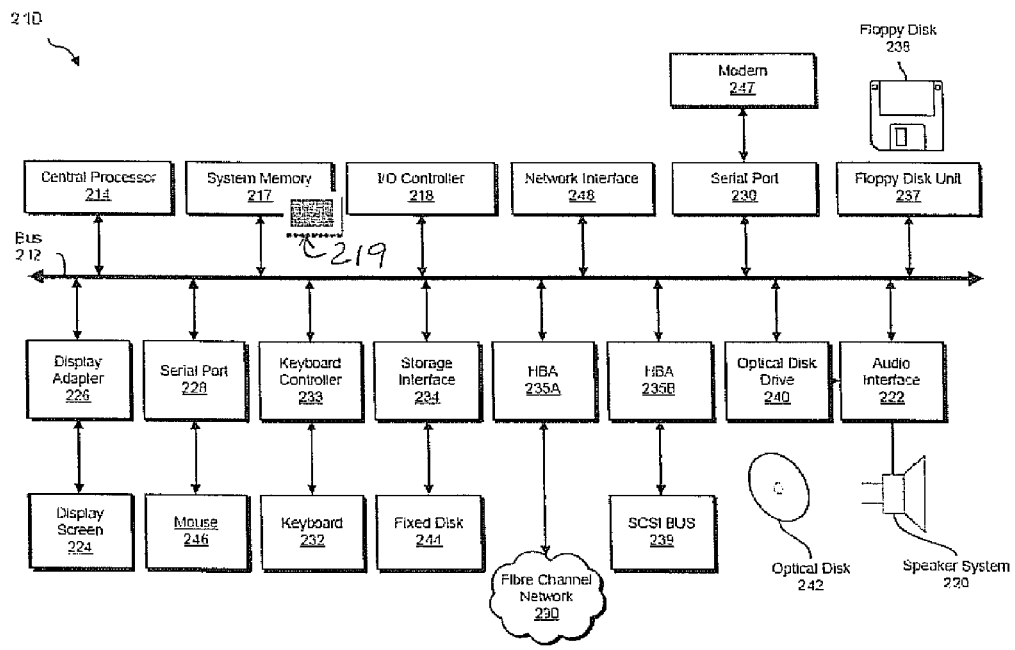
FIG. 8 depicts a block diagram of an exemplary computer system in accordance with one embodiment of the present invention.

FIG. 8 depicts a block diagram of a computer system 210 suitable for implementing the present disclosure. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fiber Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. In one embodiment, instructions for performing a memory operation method (e.g., similar to memory operation method 700) are stored in one or more memories of computer system 200 (e.g., in memory 217). The RAM is generally the main memory into which the operating system and application programs are loaded. In one embodiment, RAM 17 includes memory operation module 219. In one embodiment, memory operation module 219 is similar to memory operation module 930. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 210, modem 247, network interface 248 or some other method can be used to provide connectivity from each of client computer systems 110, 120 and 130 to network 150. Client systems 110, 120 and 130 are able to access information on storage server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or intelligent storage array 190. FIG. 6 depicts the use of a network such as the Internet for exchanging data, but the present disclosure is not limited to the Internet or any particular network-based environment.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A memory operation method comprising:
   receiving a memory operation indication;
   performing a pre-reserve allocation process before proceeding with said memory operation, wherein said pre-reserve allocation process includes converting available unallocated memory space to allocated memory space if there is sufficient available unallocated memory space to perform said memory operation and pausing a memory operation status indication to an originating application until the pre-reserve allocation process is complete;
   executing said memory operation if said pre-reserve allocation process returns an indication that there is sufficient memory space allocated to perform said memory operation; and
   aborting said memory operation if said pre-reserve allocation process returns an indication that there is not sufficient memory space allocated to perform said memory operation.

2. The memory operation method of claim 1 wherein said memory operation is a write operation.

3. The memory operation method of claim 1 wherein said pre-reserve allocation process includes:
   pausing a successful memory operation response until pre-reserve allocation operations are complete;
   determining if there is enough allocated memory space to perform said memory operation;
   determining if there is enough unallocated physical memory space available for conversion to allocated memory space;
   converting unallocated memory space to allocated memory space if there is enough physical memory space available to perform the memory operation and not enough allocated memory space to perform said memory operation;
   forwarding a sufficient allocated memory space indication if said pre-reserve allocation operation is able to establish sufficient allocated memory space; and
   forwarding an insufficient allocated memory space indication if said pre-reserve allocation operation is not able to establish sufficient allocated memory space.

4. The memory operation method of claim 1 wherein said pre-reserve allocation process allocates memory space on an as needed basis.

5. The memory operation method of claim 1 wherein said pre-reserve allocation process allocates sufficient memory space to handle a future memory operation.

6. The memory operation method of claim 1 wherein said memory operation is a two phase confirm memory operation and said aborting is performed before a first phase of a two phase confirm memory operation.

7. The memory operation method of claim 1 further comprising performing corrective measures if said pre-reserve allocation process returns an out of physical memory indication.

8. A non-transitory computer readable storage medium having stored thereon, computer-executable instructions that when executed by a computing device cause the computing device to perform a method comprising:
   receiving a memory operation indication;
   performing a pre-reserve allocation process before proceeding with said memory operation, wherein said pre-reserve allocation process includes converting available unallocated memory space to allocated memory space if there is sufficient available unallocated memory space to perform said memory operation and pausing a memory operation status indication to an originating application until the pre-reserve allocation process is complete;
   executing said memory operation if said pre-reserve allocation process returns an indication there is sufficient memory space allocated to perform said memory operation; and
   aborting said memory operation if said pre-reserve allocation process returns an indication there is not sufficient memory space allocated to perform said memory operation.

9. The non-transitory computer readable storage medium of claim 8 wherein said memory operation is a write operation.

10. The non-transitory computer readable storage medium of claim 8 wherein said pre-reserve allocation process includes:
    pausing a successful memory operation response until pre-reserve allocation operations are complete;
    determining if there is enough allocated memory space to perform said memory operation;

determining if there is enough unallocated physical memory space available for conversion to allocated memory space;

converting unallocated memory space to allocated memory space if there is enough physical memory space available to perform the memory operation and not enough allocated memory space to perform said memory operation;

forwarding a sufficient allocated memory space indication if said pre-reserve allocation operation is able to establish sufficient allocated memory space; and forwarding an insufficient allocated memory space indication if said pre-reserve allocation operation is not able to establish sufficient allocated memory space.

11. The non-transitory computer readable storage medium of claim 8 wherein said pre-reserve allocation process allocates memory space on an as needed basis.

12. The non-transitory computer readable storage medium of claim 8 wherein said pre-reserve allocation process allocates sufficient memory space to handle a future memory operation.

13. The non-transitory computer readable storage medium of claim 8 wherein said memory operation is a two phase confirm memory operation and said aborting is performed before a first phase of a two phase confirm memory operation.

14. The non-transitory computer readable storage medium of claim 8 further comprising performing corrective measures if said pre-reserve allocation process returns an out of physical memory indication.

15. A system, comprising:
a computer system having a processor coupled to a computer readable storage media and executing computer readable code which causes the computer system to perform a method of:
receiving a memory operation indication;
performing a pre-reserve allocation process before proceeding with said memory operation, wherein said pre-reserve allocation process includes converting available unallocated memory space to allocated memory space if there is sufficient available unallocated memory space to perform said memory operation and pausing a memory operation status indication to an originating application until the pre-reserve allocation process is complete;
executing said memory operation if said pre-reserve allocation process returns an indication there is sufficient memory space allocated to perform said memory operation; and
aborting said memory operation if said pre-reserve allocation process returns an indication there is not sufficient memory space allocated to perform said memory operation.

16. The memory operation method of claim 15 wherein said memory operation is a write operation.

17. The memory operation method of claim 15 wherein said pre-reserve allocation process includes:
pausing a successful memory operation response until pre-reserve allocation operations are complete;
determining if there is enough allocated memory space to perform said memory operation;
determining if there is enough unallocated physical memory space available for conversion to allocated memory space;
converting unallocated memory space to allocated memory space if there is enough physical memory space available to perform the memory operation and not enough allocated memory space to perform said memory operation;
forwarding a sufficient allocated memory space indication if said pre-reserve allocation operation is able to establish sufficient allocated memory space; and
forwarding an insufficient allocated memory space indication if said pre-reserve allocation operation is not able to establish sufficient allocated memory space.

18. The memory operation method of claim 15 wherein said pre-reserve allocation process allocates memory space on an as needed basis.

19. The memory operation method of claim 15 wherein said pre-reserve allocation process allocates sufficient memory space to handle a future memory operation.

20. The memory operation method of claim 15 wherein said memory operation is a two phase confirm memory operation and said aborting is performed before a first phase of a two phase confirm memory operation.

* * * * *